(12) United States Patent
Wang

(10) Patent No.: US 11,448,851 B2
(45) Date of Patent: Sep. 20, 2022

(54) LENS DRIVING DEVICE, CAMERA DEVICE AND ELECTRONIC APPARATUS

(71) Applicant: New Shicoh Motor Co., Ltd., Jiashan (CN)

(72) Inventor: Zaiwei Wang, Jiashan (CN)

(73) Assignee: NEW SHICOH MOTOR CO., LTD., Zhejiang (CN)

( * ) Notice: Subject to any disclaimer, the term of this patent is extended or adjusted under 35 U.S.C. 154(b) by 307 days.

(21) Appl. No.: 16/715,494

(22) Filed: Dec. 16, 2019

(65) Prior Publication Data

US 2020/0192054 A1 Jun. 18, 2020

(30) Foreign Application Priority Data

Dec. 17, 2018 (CN) .......................... 201811544204.6

(51) Int. Cl.
*G02B 7/02* (2021.01)
*G02B 7/04* (2021.01)
*G03B 13/34* (2021.01)

(52) U.S. Cl.
CPC ............... *G02B 7/04* (2013.01); *G03B 13/34* (2013.01)

(58) Field of Classification Search
CPC ... G02B 7/04; G02B 7/08; G02B 7/09; G02B 7/021; G03B 3/10; G03B 13/34; G03B 13/36; G03B 17/12; G03B 2205/0069

USPC .................................. 359/694–706, 822–826
See application file for complete search history.

(56) References Cited

U.S. PATENT DOCUMENTS

| | | | |
|---|---|---|---|
| 2009/0122420 A1 | 5/2009 | Sue et al. | |
| 2018/0348594 A1* | 12/2018 | Shin | H02K 41/0356 |
| 2020/0033551 A1* | 1/2020 | Lee | G03B 3/10 |

FOREIGN PATENT DOCUMENTS

| | | |
|---|---|---|
| CN | 105759391 A | 7/2016 |
| JP | 2009122360 A | 6/2009 |
| JP | 2009265210 A | 11/2009 |
| JP | 2013061678 A | 4/2013 |
| JP | 2014206591 A | 10/2014 |
| KR | 20080076841 A | 8/2008 |
| KR | 1020160068133 | 6/2016 |
| WO | 2014103457 A1 | 7/2014 |

* cited by examiner

*Primary Examiner* — Mahidere S Sahle
(74) *Attorney, Agent, or Firm* — Hayes Soloway P.C.

(57) ABSTRACT

A lens driving device is described that includes a housing, a spacer, a lens supporting body, a coil, a magnet, and a base. The lens supporting body is disposed on the base, the spacer is disposed within the housing, and the housing covers the spacer, the lens supporting body, the coil and the magnet, and is connected to the base. The lens driving device further includes at least three elastic pieces. The at least three elastic pieces are respectively disposed on the base and the spacer and are connected to the base and the lens supporting body.

8 Claims, 10 Drawing Sheets

LENS DRIVING DEVICE, CAMERA DEVICE AND ELECTRONIC APPARATUS

CROSS-REFERENCE TO RELATED APPLICATION

This application claims the benefit of Chinese patent application CN2018 11544204.6, filed on Dec. 17, 2018, the contents of which are incorporated herein by reference.

TECHNICAL FIELD

The present disclosure relates to a lens driving device, a camera device and an electronic apparatus.

BACKGROUND

With the popularization of electronic products, a large number of electronic apparatus are equipped with cameras. For example, a miniature camera is arranged in an electronic apparatus such as a mobile phone or a tablet computer. Some of these miniature cameras are autofocusable. A lens driving device for driving the lens is provided in the autofocus miniature camera.

A patent application (Chinese Publication No. CN105759391A) discloses a lens driving device comprising a coil holder, two magnets, a supporting body, a first elastic member and a second elastic member.

It can be seen that in the prior art, the conventional lens driving device is generally provided with two elastic members having elastic arms respectively disposed on the upper and lower sides of the supporting body for supporting the upper and lower sides of the coil holder. However, the driving force of the lens driving device having such structure is not strong enough, and the heaviest weight that it can push is 0.9 g, usually 0.1 g.

Therefore, in a case where large driving force is needed, that is, where an overweight lens is driven, the elastic arms of the elastic members will be thickened to ensure the linear movement of the lens. However, when the elastic members are thickened, the elastic coefficient thereof is affected. Therefore, in order to ensure a certain range of elastic coefficient k value, the elastic arms will be designed to increase the length, which occupies a lot of space. In addition, the posture/position accuracy of the lens support is also deteriorated.

Thus, those skilled in the art are committed to developing and improving the structure of the lens driving device in order to solve the above technical problems.

The present disclosure solves the problem of the conventional technology, and provides a lens driving device, a camera device and an electronic apparatus applicable to a case where large driving force is needed, that is, where an overweight lens is driven.

SUMMARY

In accordance with one aspect of the invention, there is provided a lens driving device including a housing, a spacer, a lens supporting body, a coil, a magnet, a base, and at least three elastic pieces. The lens supporting body is disposed on the base, the spacer is disposed within the housing, and the housing covers the spacer, the lens supporting body, the coil and the magnet and is connected to the base. The at least three elastic pieces are respectively disposed on the base and the spacer and connect the base and the spacer with the lens supporting body.

The present disclosure further provides a camera device provided with a lens driving device as described above.

The present disclosure further provides an electronic apparatus provided with a camera device as described above.

DESCRIPTION OF DRAWINGS

The above and other features, properties and advantages of the present disclosure will become more apparent from the description in conjunction with the accompanying drawings and Examples. The same reference numerals in the drawings indicate the same elements, constitutions, and features.

DETAILED DESCRIPTION

Figure 1:
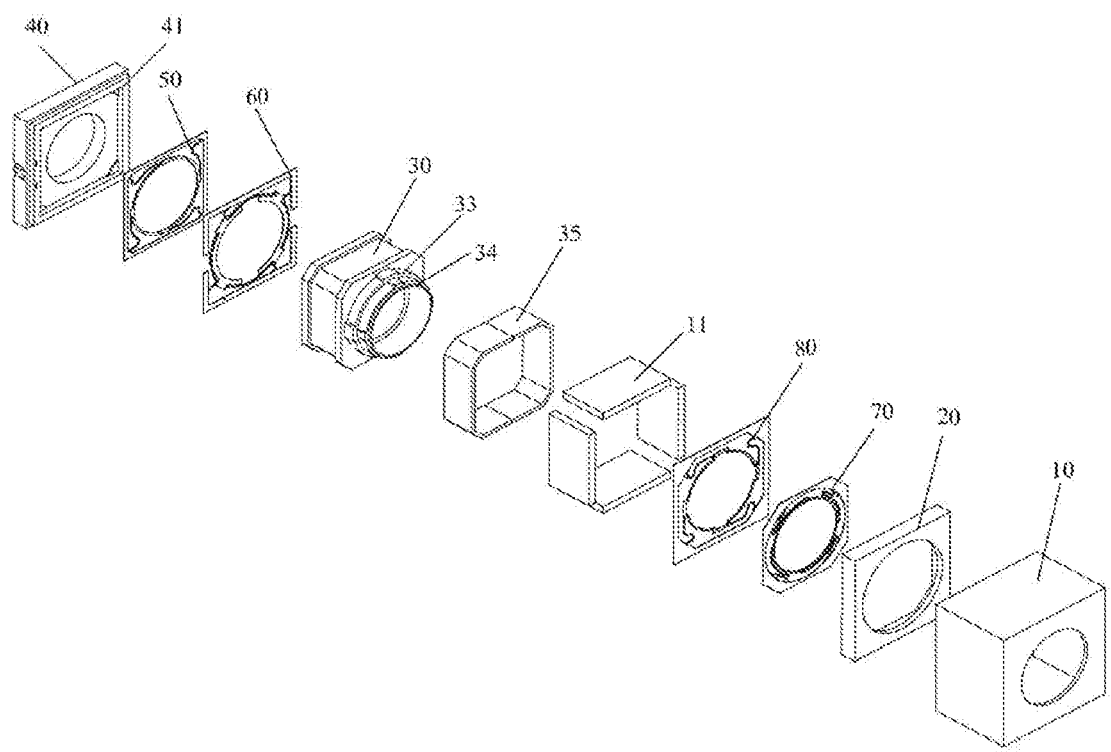
FIG. 1 is an exploded view of a lens driving device of the present disclosure.

In order to make the above-described objects, features and advantages of the present disclosure more apparent and obvious, the specific embodiments of the present disclosure will be hereinafter described in detail with reference to the accompanying drawings.

Wherever possible, the same reference numerals in the drawings will be used to refer to the same or like parts.

Further, although the terms used in the present disclosure are selected from well-known common terms, some of the terms mentioned in the specification of the present disclosure may be selected by the applicant according to his or her judgment, and the detailed meanings thereof are explained in the relevant parts of the description herein.

Furthermore, it is to be noted that the present disclosure shall be understood not only by the actual terms used, but also by the meaning implied in each term.

Figure 2:
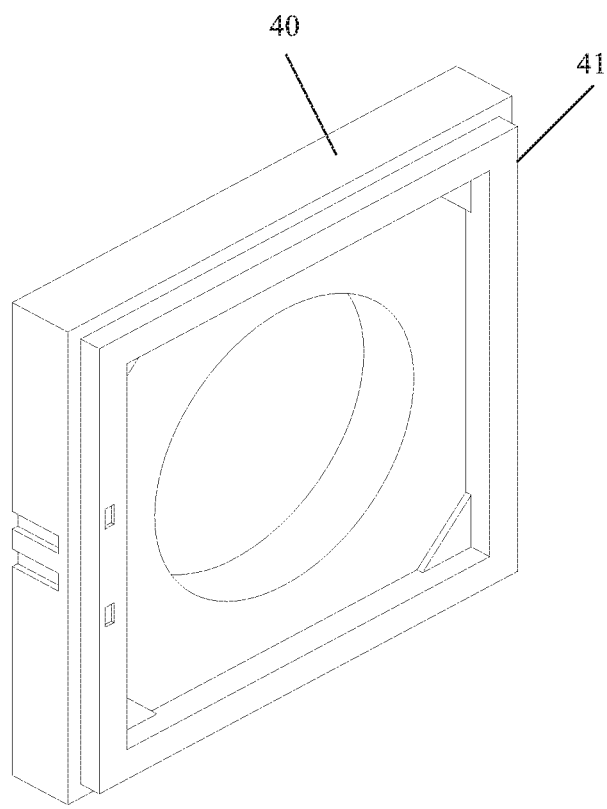
FIG. 2 is a perspective view of a base in the lens driving device of the present disclosure.
Figure 3:
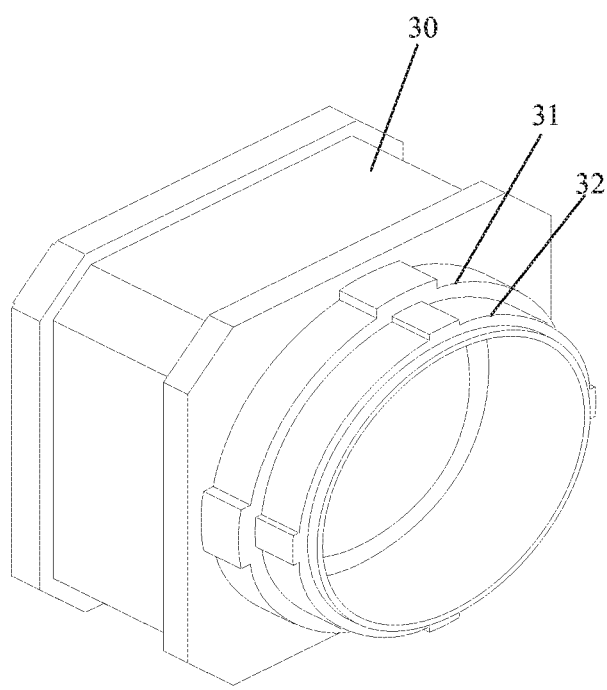
FIG. 3 is a perspective view of a lens supporting body in the lens driving device of the present disclosure.
Figure 4:
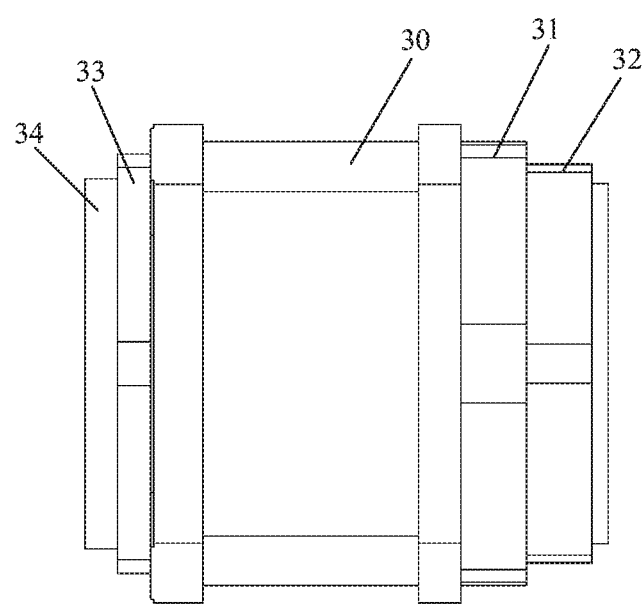
FIG. 4 is a side view of the lens supporting body in the lens driving device of the present disclosure.
Figure 5:
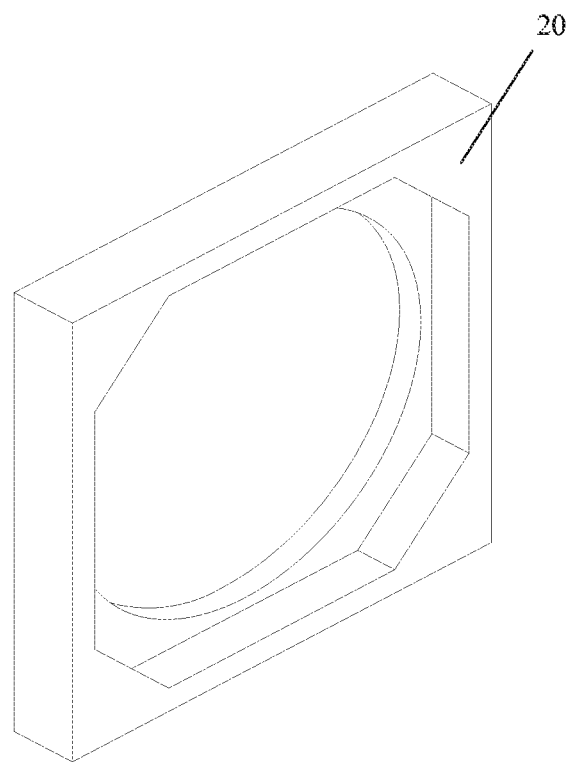
FIG. 5 is a perspective view of a spacer in the lens driving device of the present disclosure.
Figure 6:
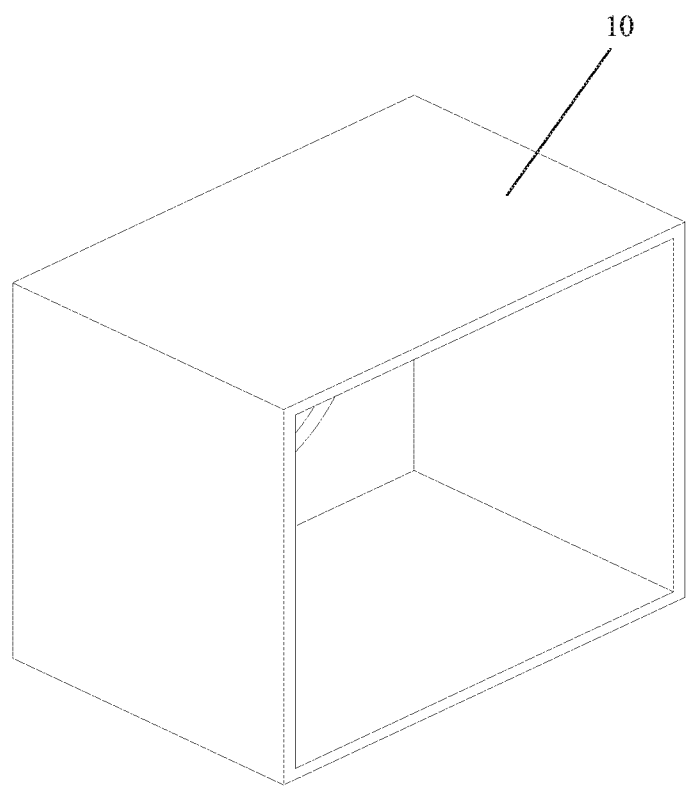
FIG. 6 is a perspective view of a housing of the lens driving device of the present disclosure.
Figure 7:
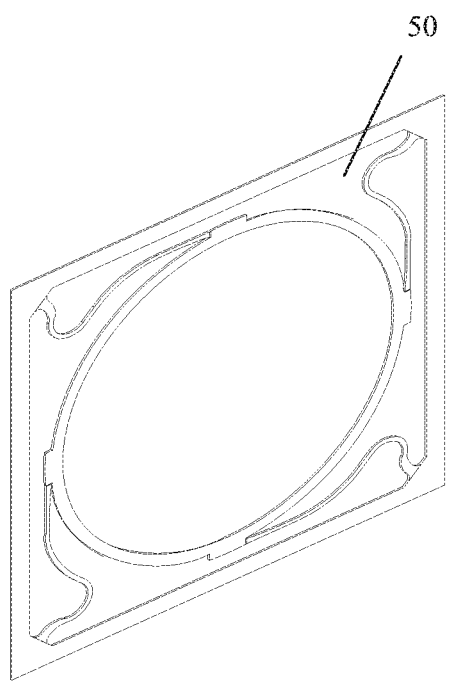
FIG. 7 is a perspective view of a first elastic piece in the lens driving device of the present disclosure.
Figure 8:
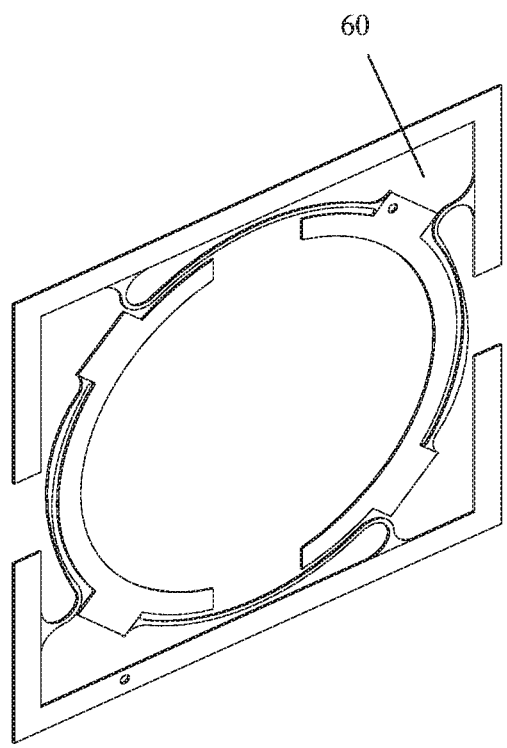
FIG. 8 is a perspective view of a second elastic piece in the lens driving device of the present disclosure.
Figure 9:
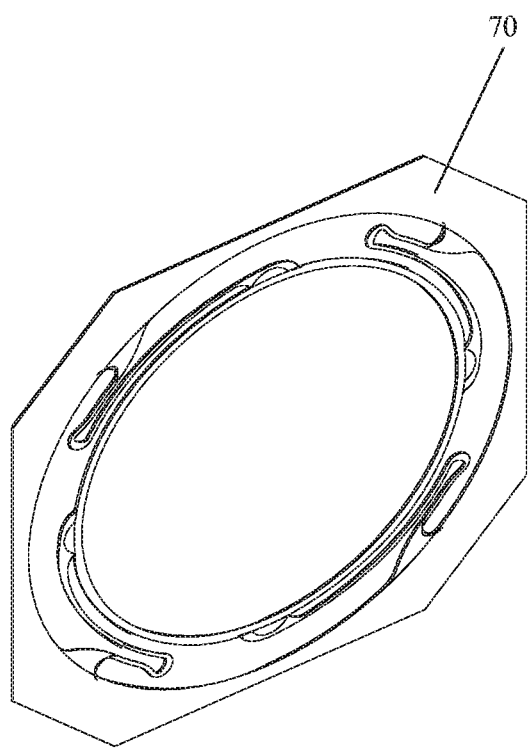
FIG. 9 is a perspective view of a third elastic piece in the lens driving device of the present disclosure.
Figure 10:
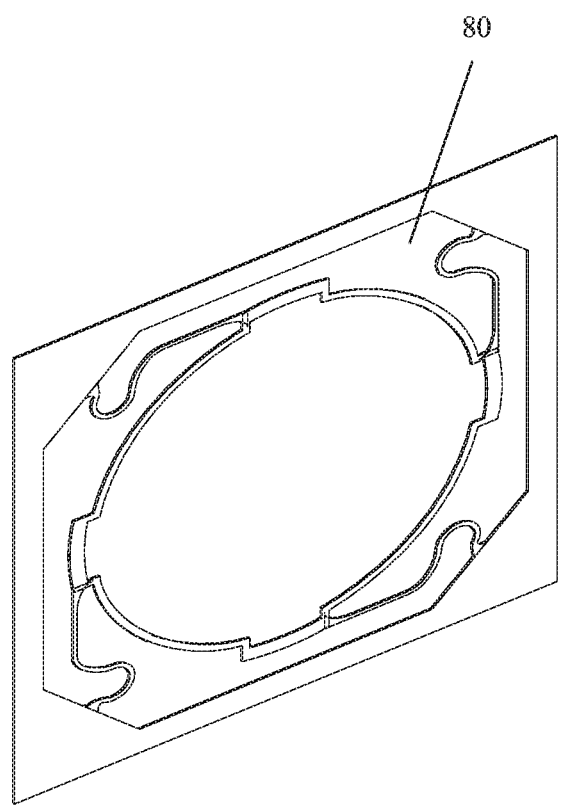
FIG. 10 is a perspective view of a fourth elastic piece in the lens driving device of the present disclosure.

FIG. 1 is an exploded view of a lens driving device of the present disclosure. FIG. 2 is a perspective view of a base in the lens driving device of the present disclosure. FIG. 3 is a perspective view of a lens supporting body in the lens driving device of the present disclosure. FIG. 4 is a side view of the lens supporting body in the lens driving device of the present disclosure. FIG. 5 is a perspective view of a spacer in the lens driving device of the present disclosure. FIG. 6 is a perspective view of a housing in the lens driving device of the present disclosure. FIG. 7 is a perspective view of a first elastic piece in the lens driving device of the present disclosure. FIG. 8 is a perspective view of a second elastic piece in the lens driving device of the present disclosure. FIG. 9 is a perspective view of a third elastic piece in the lens driving device of the present disclosure. FIG. 10 is a perspective view of a fourth elastic piece in the lens driving device of the present disclosure.

As shown in FIG. 1 to FIG. 10, the present disclosure discloses a lens driving device including a housing 10, a spacer 20, a lens supporting body 30 and a base 40. The lens supporting body 30 is disposed on the base 40, the spacer 20 is disposed within the housing 10, and the housing 10 covers the lens supporting body 30, the spacer 20, and the magnet 11 and is connected to the base 40. In addition, the lens driving device includes at least three elastic pieces provided in the housing 10.

Preferably, at least one of the elastic pieces is disposed on the base 40, and the remaining at least two elastic pieces are disposed on the spacer 20. Or at least one of the elastic pieces is disposed on the spacer 20, and the remaining at least two elastic pieces are disposed on the base 40. That is, each of the elastic pieces has an outside portion attached to the base 40 or the spacer 20, an inside portion attached to the lens supporting body 30, and a plurality of elastic arm portions connecting the outside portion and the inside portion.

Preferably, the lens driving device according to the present embodiment includes a first elastic piece 50, a second elastic piece 60 and a third elastic piece 70. The first elastic piece 50 and the second elastic piece 60 are mounted to the base 40, and the third elastic piece 70 is mounted to the spacer 20. At the same time, a first step 41 is provided on the base 40, and the first elastic piece 50 is placed on the first step 41 (see FIG. 2). A bottom end of the lens supporting body 30 is provided with a second step 31 and a third step 32 sequentially protruding outwardly (see FIGS. 3 and 4). The second elastic piece 60 is mounted on the second step 31, and the first elastic piece 50 is mounted on the third step 32. The second elastic piece 60 is connected to a coil 35 on the lens supporting body 30, and the second elastic piece 60 is connected to a terminal of an external power supply.

In particular, here, the first elastic piece 50 and the base 40 are connected by hot riveting and/or adhesive, and the second elastic piece 60 and lens supporting body 30 are connected by hot riveting and/or adhesive.

Further, a groove (not shown) is provided on the bottom end surface of the spacer 20 and the third elastic piece 70 is mounted in the groove.

Furthermore, a fourth elastic piece 80 is mounted on the bottom end surface of the spacer 20, the third elastic piece 70, the fourth elastic piece 80 and the spacer 20 are connected to each other by hot riveting and/or adhesive.

Similarly, an upper end of the lens supporting body 30 is provided with a fourth step 33 and a fifth step 34 sequentially protruding outwardly (FIG. 4). The fourth elastic piece 80 is mounted to the fourth step 33, and the third elastic piece 70 is mounted to the fifth step 34.

Further, a magnet 11 is disposed around the inner surface of the housing 10 so that the bottom portion of the magnet 11 abuts against the fourth elastic piece 80.

According to the above structure, the lens driving device may be assembled by the following steps.

First, the third elastic piece 70 is disposed in the groove of the spacer 20, preferentially using a joining method of hot riveting or adhesive, and the fourth elastic piece 80 is disposed to the spacer 20 (the bottom surface thereof), preferentially by a joining method of hot riveting or adhesive.

Next, the spacer 20 is disposed in the housing 10, preferentially by adhesive. The magnet 11 is disposed along the four edges of the housing 10 such that the bottom surface of the magnet 11 abuts against the fourth elastic piece 80, thereby enhancing the effect of pressing and tight adhering the fourth elastic piece 80 so that the fourth elastic piece 80 does not easily fall off.

Then, the first elastic piece 50 is disposed at a corresponding position (that is, the bottom surface on the inner side of the first step 41) of the base 40, preferentially using the joining method of hot riveting or adhesive; the second elastic piece 60 is disposed to the first step 41 of the base 40, preferentially using the joining method of hot riveting or adhesive.

In addition, the lens supporting body 30 is provided with a step-like placement structure corresponding to the first elastic piece 50, the second elastic piece 60, the third elastic piece 70 and the fourth elastic piece 80. The inner diameter of the third elastic piece 70 is preferably smaller than the inner diameter of the fourth elastic piece 80, and the inner diameter of the first elastic piece 50 is preferably smaller than the inner diameter of the second elastic piece 60. Further, the lens supporting body 30 is provided with a coil 35 in advance.

Finally, the lens supporting body 30 is disposed on the base 40, and the housing 10 is connected and fixed to the base 40. At that time, the first elastic piece 50 is arranged on the third step 32, the second elastic piece 60 is arranged on the second step 31, the third elastic piece 70 is arranged on the fifth step 34, and the fourth elastic piece 80 is arranged on the fourth step 33. An adhesive is applied to the above-mentioned step-like arrangement structure (i.e., the second step 31, the third step 32, the fourth step 33 and the fifth step 34) or to the elastic piece to perform adhesion. Thereby, the assembled third elastic piece 70, fourth elastic piece 80, housing 10, spacer 20 and the magnet 11 are assembled with the assembled base 40, the first elastic piece 50, the second elastic piece 60, and the lens carrier 30 carrying the coil 35.

As described above, in the lens driving device of the present disclosure, there are a plurality of elastic pieces on at least one side among the elastic pieces attached to both sides of the lens supporting body 30. That is, there are at least three elastic pieces. In this Example, the case of having three elastic pieces or four elastic pieces is exemplified, but it is not limited by the Example herein, and a structure using more elastic pieces may be configured.

Conventionally, in the case where large driving force is required, that is, where an overweight lens is driven, it is necessary to secure the linear motion of the lens by thickening the elastic arm portions of the elastic pieces, and in order to ensure the elastic coefficient k value, it is necessary to increase the length of the elastic arm portions, which occupies space. In addition, the posture and the position accuracy of the lens supporting body deteriorated. However, in the lens driving device according the present embodiment, at least three elastic pieces connect the base and the spacer with the lens supporting body, thereby, the posture and position accuracy of the lens supporting body (that is, a mover) can be enhanced, and the overweight lens can be driven.

Accordingly, the lens driving device according to the present embodiment can be applied when large driving force is required, that is, when an overweight lens is driven.

Based on the above structure, the present disclosure further provides a camera device provided with a lens driving device as described above.

Based on the above structure, the present disclosure further provides an electronic apparatus provided with a camera device as described above.

According to the lens driving device, the camera device and the electronic apparatus of the present embodiment of the present disclosure, at least three elastic pieces connect the base and the spacer with the lens supporting body, thereby, the posture and the position accuracy of the lens supporting body can be further improved, and the overweight lens can be driven. Therefore, a particularly important leap-forward improvement is obtained.

The preferred embodiments of the present disclosure have been described above with reference to the accompanying drawings, but the present disclosure is not limited to these embodiments, and various modifications can be made in the case of mastering the technology according to the contents of the scope of the patent application. For example, the second step 31, the third step 32, the fourth step 33, and the fifth step 34 are attached with the second elastic piece 60, the first elastic piece 50, the fourth elastic piece 80, and the third elastic piece 70 on the surfaces on the sides away from the main body of the lens supporting body 30, the attachment may also be performed on the surface of the main body of the lens supporting body 30 by setting the height of at least one of the second step 31 and the fourth step 33 to zero. Further, a structure may be provided in which a terminal is attached to the surface of the first step 41 of the base 40 where the second elastic piece 60 is attached, and the second elastic piece 60 divided in two may be attached to the terminal of the external power supply.

While the specific embodiments of the present disclosure have been described above, those skilled in the art will appreciate that these are merely illustrative, and the protection scope of the present disclosure is defined by the appended claims. Those skilled in the art can make various changes or modifications to these embodiments without departing from the principles and spirit of the present disclosure, and such changes and modifications fall within the protection scope of the present disclosure.

What is claimed is:

1. A lens driving device comprising:
   a base,
   a lens supporting body disposed on the base, and
   at least two elastic pieces connecting the base and the lens supporting body, wherein:
   the at least two elastic pieces include a first elastic piece, and a second elastic piece disposed at the base, the second elastic piece being placed on a first step provided at the base,
   a second step and a third step are disposed on a bottom end of the lens supporting body and sequentially protruding outwardly, and
   the second elastic piece is mounted on the second step, and the first elastic piece is mounted on the third step.

2. The lens driving device according to claim 1, wherein the first elastic piece is disposed at a bottom surface on an inner side of the first step of the base.

3. The lens driving device according to claim 1, wherein the second elastic piece is connected to a coil on the lens supporting body and is connected to a terminal of an external power supply.

4. The lens driving device according to claim 1, further comprising:
   a housing, and
   a spacer disposed within the housing, wherein the housing covers the spacer, and the lens supporting body and is connected the base,
   a third elastic piece disposed at the spacer to be mounted to an upper end of the lens supporting body.

5. The lens driving device according to claim 1, wherein:
   the first elastic piece and the base are connected by hot riveting and/or adhesive, and
   the second elastic piece and the lens supporting body are connected by hot riveting and/or adhesive.

6. The lens driving device according to claim 4, wherein an inner surface of the housing is provided with a magnet and a bottom portion of the magnet abuts against the elastic piece.

7. A camera device provided with the lens driving device according to claim 1.

8. An electronic apparatus provided with the camera device according to claim 7.

* * * * *